United States Patent Office 3,399,073
Patented Aug. 27, 1968

3,399,073
POLYESTER FILMS HAVING A POLY(ALKYLENE OXIDE) GLYCOL ETHER LAYER FUSED THERETO AND PROCESS FOR MAKING SAME
John R. Caldwell and Russell Gilkey, Kingsport, Tenn., assignors to Eastman Kodak Company, Rochester, N.Y., a corporation of New Jersey
No Drawing. Filed July 22, 1964, Ser. No. 384,540
3 Claims. (Cl. 117—62.1)

ABSTRACT OF THE DISCLOSURE

A polyester sheet or film having improved surface properties is prepared by applying to and fusing with the surface of said sheet or film a hydrophilic layer composed of a poly(alkylene oxide) glycol ether containing a colloidally dispersed oxide of a polyvalent metal.

---

This invention relates to the surface coating of polyester sheets and films to give such materials improved wettability by aqueous and other solutions, improved dyeability and especially improved adhesive properties for various gelatin, poly(vinyl alcohol) and other subs and coatings applied from aqueous solutions and for lacquers, printing inks and other materials.

It is known to coat polyester sheets, films and the like with resinous compositions to render the surface of such films receptive of coatings of various organic materials. For example, in U.S. Patent 2,893,896 it has been proposed to coat the surface of a polyethylene terephthalate sheet or film which has a normally hydrophobic, chemically inert surface with a halogenated fatty acid dissolved in an inorganic solvent followed by heating to a temperature of 100–300° F. The resulting sheet is said to be susceptible of receiving various coatings to make it useful as a drawing paper or medium and also to receive photosensitive coatings based on gelatin. Similarly, in U.S. Patent 2,874,046 there is described a method of subbing a film support derived by the condensation of terephthalic acid and a glycol to render it susceptible of receiving a photosensitive layer by applying to the support a sub consisting of an unsaturated polyester of an aromatic compound with two aliphatically bonded hydroxy groups and unsaturated dicarboxylic acids. Likewise, British Patent 770,766 describes the application to the surface of a polyester film or fiber of an unsaturated alkyd type resin. The application of alkyd type resins to polyester surfaces as disclosed in this and other prior art will not impart hydrophilic properties because it is well known that alkyd resins are fundamentally hydrophobic in nature. Furthermore, alkyd resins have little or no affinity for many types of coloring agents represented by mordant type dyes. It is thus apparent that coatings of this type have severe limitations.

It is also well known that because of the hydrophobic nature of linear polyesters such materials do not have a satisfactory degree of wettability and this limits their usefulness particularly in photographic film base and similar sheet material in which it is customary or necessary to deposit layers of various materials such as gelatin and poly(vinyl alcohol) from aqueous or other solutions in order to obtain surfaces to which photographic emulsions and other materials may readily adhere. Wettability is also important where it is desired to apply dyes or printing inks from aqueous or other solutions and polyester sheet material has been markedly deficient in this property.

This invention has as its principal object to overcome the above-described difficulties due to the hydrophobic nature of polyester material in the form of sheets and films and to provide a means of rendering such polyester sheets and films susceptible of permanently receiving subs, coatings and other layers of such material as gelatin, poly(vinyl alcohol), dyes, printing inks, lacquers and other substances.

Another object is to provide polyester sheet and film material with an extremely thin but permanently affixed layer or coating of a material which is essentially hydrophilic in character and will readily receive and retain coatings or layers of various substances such as gelatin, poly(vinyl alcohol) and dyes, particularly when deposited from aqueous and other media.

Another object is to provide polyester sheet and film material of the type referred to in the preceding paragraph in which the coating contains a metal oxide which facilitates the coloring of the sheet material by mordant type dyes.

Another object is to provide an improved process for depositing on the surface of a normally hydrophobic polyester sheet or film material an extremely thin fused layer of readily wettable, hydrophilic material which renders the coated sheet susceptible of readily receiving and retaining coatings or layers of various substances such as gelatin, poly(vinyl alcohol), dyes, printing inks and other material, particularly when deposited from aqueous or other media.

Other objects will appear hereinafter.

These objects are accomplished by the following invention which comprises applying to and fusing with the surface of a normally hydrophobic, solvent-resistant, high melting, crystalline polyester film an extremely thin polymeric coating composed of a poly(alkylene oxide) glycol ether or derivative thereof. Such compounds are linear polyethers having the structural formula:

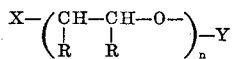

wherein R is a substituent selected from the group consisting of hydrogen, methyl, ethyl, and phenyl; X is a substituent selected from the group consisting of —OH, hydrogen, and substituted or unsubstituted alkyl, alkoxy, aryl, aryloxy, benzyl, acyl represented by

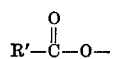

wherein R' is a substituent selected from the groups consisting of alkyl, aryl, alkylene and arylene groups; Y is a substituent selected from the group consisting of hydrogen and substituted or unsubstituted alkyl, aryl, benzyl, and acyl represented by

wherein R' is a substituent selected from the group consisting of alkyl, aryl, alkylene and arylene groups; and n is a whole number greater than 10 and preferably greater than 20. Any aromatic groups present in the above radicals may contain alkyl or aryl substituents having 1–20 carbon atoms.

One class of suitable polyethers may be described as polyoxy ethylene glycols sold under the trade names of Carbowax and Polyox Resin. By reference to the above structural formula, R, X and Y are hydrogen and *n* is 10–300. These polymers are derived from ethylene oxide. Similar polymers derived from propylene oxide or butylene oxide can also be employed. In addition, block polymers containing alternate segments of polyoxy ethylene and polyoxy propylene as represented by those compounds sold under the trade name Pluronics may also be employed.

Another class of poly(alkylene oxide) glycol ethers which may be employed in accordance with our invention are those which may be terminated on one end by an alkylated phenyl group. Examples of this type are described in U.S. Patent No. 2,213,477 and sold under the trade name of Igepal CO or Triton. This type of compound contains a free hydroxyl group and several molecules can be linked together by esterification with a polybasic acid. The polyethers may be terminated on both ends with non-reactive groups.

Branched chain polyethers can likewise be used, such as those obtained by reacting ethylene oxide or propylene oxide with compounds containing three or more hydroxyl groups.

The nature of the terminating group on the polyether molecule appears to have relatively little effect on the properties of the treated films. Polyethers having a molecular weight in the range of 1500–3000 show good resistance to removal by water, but higher molecular weights can be used. In some cases, polyethers having a molecular weight of about 800–1000 give a substantial improvement when used according to the invention.

Typical poly(alkylene oxide) glycol structures which may be employed in the practice of our invention are the following:

| Compound | Trademark designation (where applicable) |
|---|---|
| 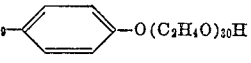 | Igepal CO-880. |
| $HO-(C_2H_4O)_{90}-H$ | Carbowax 4000. |
| $HO-\left(\begin{array}{c}CH-CH_2O\\|\\CH_3\end{array}\right)_{70}-H$ | Propylene glycol 4000. |
| $HO-(C_2H_4O)_{30}-C_{12}H_{25}$ | Brij 30. |
| $HO-(C_2H_4O)_{20}-COC_{11}H_{23}$ | Empilan AP100. |
| 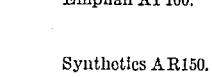 | Synthetics AR150. |
| $HO-(C_2H_4O)_{20}-CH_2CH_2\overset{H}{\underset{|}{N}}-CO-C_{17}H_{35}$ | |
| 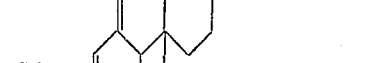 | Tween 40. |
| 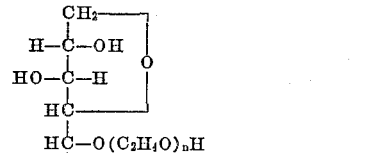 | |
| $C_8H_{17}-\phantom{xx}-O-(C_2H_4O)_{40}-CO-C_{17}H_{35}$ | |

The poly(alkylene oxide) glycol ethers may be applied to polyester sheets or films by dissolving the ether compound in water or alcohol or a combination of the two and spraying the solution on the polyester sheet or film or by immersing the film in the solution of the ether compound. In some cases the ether compound is applied in the form of an emulsion which is prepared by stirring the ether compound in water in the presence of a surfactant. After application of the ether compound to the polyester sheet or film, the material is subjected to a heat treatment at a temperature within the range of 140°C. to 220°C., and preferably to a temperature within the range of 150°C. to 200°C., for a period of one second to 15 minutes after the solvent has evaporated. This results in fusing the poly(alkylene oxide) glycol ether material into the surface of the polyester sheet or film thus providing an extremely thin hydrophilic layer which gives the polyester sheet material the ability to readily receive and retain coatings or layers of various substances such as gelatin, poly(vinyl alcohol), dyes, printing inks, lacquers and other substances. The deposition of this extremely thin layer also gives the polyester sheet material greatly enhanced wettability which facilitates the deposition from aqueous or other solutions of the substances just mentioned. This is of particular importance when the polyester sheet or film is employed as a photographic film base since it enables the deposition and permanent retention by the sheet of gelatin subs upon which the photographic emulsion is later deposited. It also facilitates coloring the polyester sheet material by dyes, printing inks and the like which are usually deposited from aqueous media.

We have also found that by incorporating certain ester-interchange catalysts into a poly(alkylene oxide) glycol ether layer which is composed of a polyether which has at least one free hydroxyl group, a chemical bond between the polyether and the polyester film surface to which it is applied can be made to form. In other words, ester-interchange between the free hydroxyl group of the polyether and the polyester substrate occurs when the coated film is heated to a temperature of 180°C. to 200°C. for several minutes. Thus the polyether becomes chemically attached to the polyester film through an ester linkage in addition to the effect of fusion which results when the coated polyester sheet is subjected to heating. Any suitable ester interchange catalyst may be employed for this purpose. Typical compounds are titanium tetrabutoxide, dibutyl tin diacetate, zinc acetate, manganese acetate, lead borate, sodium methoxide, antimony trioxide, and sodium aluminate.

In the following examples and description we have set forth several of the preferred embodiments of our invention but they are included merely for purposes of illustration and not as a limitation thereof.

Example I

One g. of Dow polypropylene glycol 11–300, which is the trademark of a reaction product of propylene oxide and a trihydric alcohol and having a molecular weight of about 3000, was dissolved in a mixture of 150 cc. of alcohol and 150 cc. of water. Polyester films were dipped into the solution, the solvent was evaporated, and the films were heated at 180–200° for 3 minutes. The films were made from poly(ethylene terephthalate). The treated films showed greatly improved adhesion for coatings of gelatin and poly(vinyl alcohol). Thin coatings deposited from rubber latex also showed good adhesion. The treated film was readily printed with the usual types of inks and the printing showed good resistance to abrasion.

Similar results were obtained by using a film made from a polyester having the composition: 1 mole of terephthalic acid plus 1 mole of 1,4-cyclohexanedimethanol.

Example II

Two moles of Igepal CO-880 and one mole of sebacic acid were heated at 200–220° for 3 hours to form an ester. The structure of Igepal CO–880 is given in the table referred to above.

One g. of the ester was dissolved in 200 cc. of water and poly(ethylene terephthalate) films were dipped into the solution. The water was evaporated and the films were heated at 160° for 6 minutes. The treated films showed improved adhesion for poly(vinyl alcohol) and gelatin coatings. Furthermore, when aqueous solutions were applied to the films, wetting was instantaneous and the solutions spread uniformly over the surface. There was no tendency to form beads or droplets, as on untreated film.

Similar results were obtained on films made from a polyester having the composition: 0.92 mole terephthalic acid plus 1.0 mole 1,4-cyclohexanedimethanol plus 0.08 mole isophthalic acid. In this case, the films were heated at 180–200° for one minute to fix the ester.

Example III

Polypropylene glycol having a molecular weight of 4000–6000 was emulsified in water by stirring in the presence of a surfactant (Igepal CO–850). The emulsion was diluted to a concentration of 0.5 percent and sprayed on one side of a poly(ethylene terephthalate) wrapping film. The film was then heated at 160–170° for 2 minutes. The treated film showed improved retention of printing inks.

Similar results were obtained by treating films made from the following polyesters:

(a) 2,6-naphthalenedicarboxylic acid plus ethylene glycol
(b) 2,6-naphthalenedicarboxylic acid plus neopentyl glycol
(c) terephthalic acid plus 2,2,4,4-tetramethylcyclobutane-1,3-diol
(d) 4,4'-sulfonyldibenzoic acid plus 1,5-pentanediol
(e) 4,4'-diphenic acid plus hexamethylene glycol

Example IV

One mole of Pluronic L–62 was heated with one mole of adipic acid to give a poly(ether-ester) having a molecular weight of about 8000 or higher. Pluronic L–62 is the trademark of a segmented polyether containing poly(ethylene oxide) and poly(propylene oxide) units, made by Wyandotte Chemical Company.

The poly(ether-ester) was used as described in Example III above with similar results.

Example V

Styrene glycol (Dow) was used as described in Example III with comparable results. This polyether has the structure:

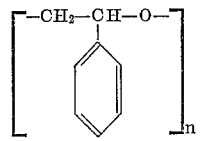

where $n$ is about 5–20.

Example VI

Polybutylene glycol having a molecular weight of 2000–4000 was used as described in Example III above with good results.

Example VII

One g. of titanium butoxide and 0.5 g. of Carbowax 1500 were dissolved in 99 g. of toluene. Polyethylene terephthalate film was dipped into the solution, the solvent was evaporated and the film was heated at 200° C. for 5 minutes. Gelatin and poly(vinyl alcohol) showed good adhesion on the treated film.

Example VIII

One g. of titanium butoxide and 0.8 g. of Carbowax 6000 were dissolved in 50 g. of toluene. Polyethylene terephthalate films were dipped into the solution and heated at 200° for 5 minutes. Gelatin and poly(vinyl alcohol) showed good adhesion on the treated films.

Carbowax having a molecular weight of 20,000 was used, with similar results. Carbowax 1500 also was used. Heating the films at 160° for 5 minutes gave good attachment.

Example IX

One g. of Carbowax 6000 and 0.2 g. titanium butoxide were dissolved in 100 cc. of isopropyl alcohol. Polyethylene terephthalate film was dipped into the solution and, after evaporation of the solvent, was heated at 160° for 5 minutes. Poly(vinyl alcohol) and gelatin showed good adhesion on the treated film.

Example X

One g. of Carbowax 6000 was dissolved in 50/50 toluene-alcohol mixture and a polyester film was dipped into the solution. The polyester was made from terephthalic acid and 1,4-cyclohexanedimethanol. After the solvent was evaporated, the film was heated at 180° for 5 minutes. Gelatin and poly(vinyl alcohol) showed good adhesion.

Example XI

One g. of polypropylene glycol (mol. wt. 4000) was dissolved in 200 cc. of toluene and a polyester film was coated with the solution. The polyester had the composition 0.85 mole terephthalic acid plus 0.15 mole isophthalic acid plus 1.0 mole 1,4-cyclohexanedimethanol. The film was heated at 150° for 5 minutes. Poly(vinyl alcohol) and gelatin showed good adhesion. Coatings of rubber, paint, lacquer, etc. also had improved adhesion. Similar results were obtained with poly(ethylene terephthalate) film.

Example XII

Igepal CO–880 was dissolved in water to give a 0.5 percent solution. Polyester films were dipped into the solution and heated at 160–200° for 30 seconds to 5 minutes. The following types of polyesters were used:

(a) polyethylene terephthalate
(b) polyester having the composition 0.9 mole terephthalic acid plus 0.1 mole isophthtalic acid plus 1.0 mole ethylene glycol
(c) polyester having the composition 0.9 mole terephthalic acid plus 0.1 mole succinic acid plus 1.0 mole 1,4-cyclohexanedimethanol
(d) polyester having the composition 1.0 mole terephthalic acid plus 1.0 mole 2,2,4,4-tetramethylcyclobutane-1,3-diol.

The treated films showed improved adhesion toward gelatin, poly(vinyl alcohol), rubber coatings, printing inks and paint.

Example XIII

One g. of dibutyl tin dilaurate and 10 g. of polypropylene glycol 4000 were dissolved in 100 ml. of isopropyl alcohol. Polyethylene terephthalate film was dipped into the solution, the isopropyl alcohol was allowed to evaporate and the coated film was heated at 200° C. for 3 minutes. Gelatin and poly(vinyl alcohol) showed good adhesion to the treated film. Similar results were obtained with poly-2,2,4,4-tetramethyl-1,3-cyclobutylene terephthalate and carbonate films.

Example XIV

One g. of aluminum butoxide and 10 g. of the lauryl ether of polyoxyethylene glycol containing about 30 ($C_2H_4O$) groups (available commercially under the proprietary designation Brij 30) were dissolved in 100 ml. of isopropyl alcohol. Polyester films were dipped into the solution and after evaporation of the solvent were heated at 200° C. for 2 minutes. The following types of polyesters were used:

(a) polyethylene terephthalate
(b) polyethylene 2,6-naphthalene dicarboxylate
(c) poly-1,4-cyclohexylenedimethylene 83/17 molar terephthalate/isophthalate The treated films showed improved adhesion toward gelatin, poly-(vinyl alcohol), printing inks and paint.

Example XV

One-tenth g. of titanium tetrabutoxide and 10 g. of polyoxyethylene sorbitan mono palmitate (available commercially under the proprietary designation Tween 40) were dissolved in 100 ml. of toluene. Polyethylene terephthalate film was dipped into the solution and the toluene allowed to evaporate. The coated film was then heated at 180° C. for 5 minutes. Coatings of rubber, lacquer, paint, gelatin, etc. showed improved adhesion to the treated film.

Example XVI

One tenth g. of zirconium tetrabutoxide and 2 g. of polyoxyethylene glycol monolaurate (available commercially under the proprietary designation Empilan AP100) were dissolved in 100 ml. of butyl alcohol. Polyethylene terephthalate film was dipped in the solution and allowed to dry. The coated film was heated at 190° C. for 2 minutes. Improved adhesion of gelatin, lacquers, printing inks and paint to the treated film was obtained.

We have also found that the treated polyester sheets or films may be further treated to provide in the poly-(alkylene oxide) glycol ether layer a mordant type compound. For example, the poly(alkylene oxide) glycol ether or derivative may be mixed with 10-200 percent by weight of a hydrolyzable organometallic compound. The mixture can then be applied to a polyester sheet or film from non-aqueous solvents, such as alcohols and hydrocarbons, by the previously described methods, including the heating procedure to bring about fusion of the deposited ether layer with the polyester material and also to occasion ester interchange as previously described. Exposure of the thus coated film to moist air or to an alkaline environment converts the organometallic compound in the hydrophilic coating to a colloidal oxide or hydroxide having a very active surface. The resulting dispersed metal oxide or hydroxide can then function as a mordant for certain types of dyes such as Alizarine Brown R (Color Index 58200), Bordeaux R (Color Index 58230), Para Rosaniline Base (Color Index 42500), Omega Chrome Yellow 5G (Color Index 14080), Alizarine Green BB (Color Index 45510), etc.

Suitable hydrolyzable organometallic compounds are the alkoxide, acylate, halide, alkyl, aryl (or combinations thereof) derivatives of tin, titanium, aluminum and zirconium as well as of the rare earth metals. Representative examples of such compounds are titanium tetrabutoxide, dibutyl tin dichloride, trioctyl aluminum, titanium dichloride diacetate, zirconium tetrabutoxide, aluminum isopropoxide, triphenyl tin chloride, and the acetates of the rare earth metals.

Suitable hydrolyzing environments are moist air and moist air containing ammonia or amine vapors.

The amount of the metal present in the poly(alkylene oxide) glycol ether layer, calculated as the metal oxide, should be within the range of 0.1 to 30 percent, based on the weight of the total amount of the polyether layer deposited on the polyester sheet material.

Example XVII

Five g. of titanium butoxide and 5 g. of Carbowax 2000 were dissolved in 100 ml. of toluene. Polyethylene terephthalate film was sprayed with the solution in three passes on one side to obtain a solids pickup of .5 percent by weight based on the weight of the film. The toluene was allowed to flash off, the film was heated at 180° C. for 5 minutes and the coated film was exposed to the vapors from concentrated ammonium hydroxide for 10 minutes. Gelatin and poly(vinyl alcohol) showed good adhesion to the treated film. The film had good wettability and improved adhesion for waterbased printing inks. The surface of the film could also be dyed with mordant dyes due to the presence of colloidally precipitated titanium oxide. Immersing the treated film in a boiling aqueous dispersion containing .1 percent Brilliant Milling Blue BA (Color Index 42645) for 15 minutes dyed the top layer of the film blue. Since this hydrophilic layer penetrated the surface of the film, the resulting dyed layer could not be removed by washing or rubbing.

Similar results were obtained by substituting dibutyl tin dichloride, aluminum tributoxide or zirconium tetrabutoxde for the titanium butoxide.

Other mordant colors could be obtained by using Alizarine Brown R (Color Index 58200), Bordeaux R (Color Index 58230), Para Rosaniline Base (Color Index 42500), Omega Chrome Yellow 5G (Color Index 14080), Alizarine Green BB (Color Index 45510), etc.

Example XVIII

One g. of aluminum acetate and 5 g. of Carbowax 4000 were dissolved in 500 cc. of water, and 10 cc. of ammonium hydroxide were added with strong agitation. A colloidal precipitate of aluminum oxide was formed. The suspension was applied to the surface of poly(ethylene terephthalate) films and the water was evaporated at 90–100°. The treated film was then heated at 120–140° for 10 minutes.

The film showed improved wetting properties.

Salts of zirconium, tin, titanium and rare earth metals can be used in place of aluminum acetate. Other types of poly(alkylene oxide) glycol ethers can be used.

Polyester films treated by the process were coated with layers of gelatin and poly(vinyl alcohol) containing photographically active silver halide. The coatings had excellent adhesion.

It will be evident from the above description of our invention that we have provided a means of rendering a hydrophobic, high-melting linear polyester sheet and film material, which is normally resistant to the application of gelatin, poly(vinyl alcohol) and other substances, capable of receiving and permanently retaining coatings or layers of these substances as well as dyes, printing inks and various other substances by the application to the polyester material of an extremely thin, fused on hydrophilic layer. This layer also contributes improved wettability to the polyester and this greatly facilitates deposition of dyes, inks and other substances from aqueous media.

It is to be particularly noted that the deposited layer of poly(alkylene oxide) glycol ether material is in the nature of an extremely thin layer or coating which cannot be washed off, notwithstanding its hydrophilic properties. It is also to be noted that this layer is fused into the surface of the polyester material by the application of heat as described in the general description of our invention and the illustrative examples thereof. In addition, when ester interchange catalysts are employed as described, a chemical union between the poly(alkylene oxide) glycol ether material and the polyester material of the sheet or film by ester interchange occurs and this serves additionally to bond the deposited ether layer to the polyester sheet or film.

Another feature of our invention is the employment in the poly(alkylene oxide) glycol ether layer of a hydrolyzable organometallic compound which, under the influence of moist air or an alkaline environment, can be converted to a colloidal oxide or hydroxide having a very active surface which can function as a mordant for various dyes. Thus, once a polyester sheet or film material is treated in accordance with our invention and such organometallic compounds are incorporated in the hydrophilic poly(alkylene oxide) glycol ether layer, the sheet material then becomes readily dyeable by many well known mordant type dyes. This particular process of rendering polyester sheet material susceptible of dyeing is to the best of our knowledge and belief an entirely novel one.

Our improved polyester sheet material has many uses in the arts. Among these may be mentioned use as photographic film base, since the material may be readily coated with gelatin, poly(vinyl alcohol), and other substances to render it permanently susceptible of receiving photographic emulsions and other coatings. Our improved polyester sheet material is also susceptible of permanently receiving printing inks of various types including water based inks. That form of our improved sheeting which contains in the hydrophilic layer a colloidal oxide or hydroxide can be readily dyed with mordant type dyes as described above and the resultant product is susceptible of many decorative applications including wrapping material, containers and the like. Many other uses of our improved sheet material will be evident to those skilled in the art.

Although the invention has been described in considerable detail with particular reference to certain preferred embodiments thereof, variations and modifications can be effected within the spirit and scope of the invention as described hereinabove, and as defined in the appended claims.

We claim:

1. A sheet composed of a high-melting linear polyester having fused and permanently bonded thereto a hydrophilic layer composed of a poly(alkylene oxide) glycol ether having the structural formula:

$$X-(CH-CH-O)_n-Y$$
$$\quad\;\; | \quad\;\; |$$
$$\quad\;\; R \quad\;\; R$$

wherein R is a substituent selected from the group consisting of hydrogen, methyl, ethyl, and phenyl; X is a substituent selected from the group consisting of —OH, hydrogen, and substituted or unsubstituted alkyl, alkoxy, aryl, aryloxy, benzyl, acyl represented by

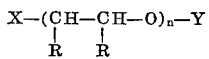

wherein R' is a substituent selected from the groups consisting of alkyl, aryl, alkylene and arylene groups; Y is a substituent selected from the group consisting of hydrogen and substituted or unsubstituted alkyl, aryl, benzyl, and acyl represented by

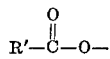

wherein R' is a substituent selected from the group consisting of alkyl, aryl, alkylene and arylene groups; and $n$ is a whole number greater than 10; said hydrophilic layer rendering said polyester sheet capable of being permanently coated with gelatin and poly(vinyl alcohol) as well as susceptible to the permanent application of printing inks and dyes, wherein said poly(alkylene oxide) glycol ether layer contains a colloidally dispersed oxide of a polyvalent metal selected from the group consisting of tin, titanium, aluminum, zirconium and the rare earth metals wherein said metal oxide is present within the range of 0.1 to 30 percent, based on the weight of the total amount of the polyether layer.

2. A process of treating a sheet composed of a high-melting linear polyester to render such sheeting capable of permanently receiving gelatin and poly(vinyl alcohol) which comprises applying to the polyester sheet material a solution of a poly(alkylene oxide) glycol ether having the structural formula:

wherein R is a substituent selected from the group consisting of hydrogen, methyl, ethyl, and phenyl; X is a substituent selected from the group consisting of —OH, hydrogen, and substituted or unsubstituted alkyl, alkoxy, aryl, aryloxy, benzyl, acyl represented by

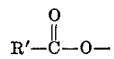

wherein R' is a substituent selected from the groups consisting of alkyl, aryl, alkylene and arylene groups; Y is a substituent selected from the group consisting of hydrogen and substituted or unsubstituted alkyl, aryl, benzyl, and acyl represented by

wherein R' is a substituent selected from the group consisting of alkyl, aryl, alkylene and arylene groups; and $n$ is a whole number greater than 10; and thereafter heating the treated sheet material to evaporate solvent therefrom and deposit thereon an extremely thin layer of the poly(alkylene oxide) glycol ether material and thereafter heating the coated polyester sheet material to a temperature of 140° to 220° C. for a period of one second to 15 minutes, whereby the ether material is fused into the surface of the polyester sheet material forming thereon a layer which cannot be removed by washing with aqueous media, wherein the solution of the poly(alkylene oxide) glycol ether contains dispersed therein a colloidal oxide of a polyvalent metal selected from the group consisting of tin, titanium, aluminum, zirconium and the rare earth metals wherein said metal oxide is present within the range of 0.1 to 30 percent, based on the weight of the total amount of the polyether layer.

3. A process of treating a sheet composed of a high-melting linear polyester to render such sheeting capable of permanently receiving gelatin and poly(vinyl alcohol) which comprises applying to the polyester sheet material a solution of a poly(alkylene oxide) glycol ether having the structural formula:

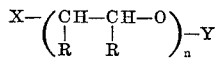

wherein R is a substituent selected from the group consisting of hydrogen, methyl, ethyl, and phenyl; X is a substituent selected from the group consisting of —OH, hydrogen, and substituted or unsubstituted alkyl, alkoxy, aryl, aryloxy, benzyl, acyl represented by

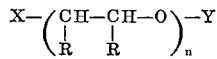

wherein R' is a substituent selected from the groups consisting of alkyl, aryl, alkylene and arylene groups; Y is a substituent selected from the group consisting of hydrogen and substituted or unsubstituted alkyl, aryl, benzyl, and acyl represented by

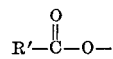

wherein R' is a substituent selected from the group consisting of alkyl, aryl, alkylene and arylene groups; and $n$ is a whole number greater than 10; and thereafter heating the treated sheet material to evaporate solvent therefrom and deposit thereon an extremely thin layer of the poly(alkylene oxide) glycol ether material and thereafter heating the coated polyester sheet material to a temperature of 140° to 220° C. for a period of one second to 15 minutes, whereby the ether material is fused into the surface of the polyester sheet material forming thereon a layer which cannot be removed by washing with aqueous media, wherein the deposited layer of poly(alkylene oxide) glycol ether contains a hydrolyzable organometallic compound selected from the group consisting of the alkoxides, acylates, halides and the alkyl and aryl derivatives of tin, titanium, aluminum, zirconium and the rare earth metals, said organometallic compound being present in an amount sufficient to provide a metal oxide within the range of 0.1 to 30 percent, based on the weight of the total amount of the polyether layer; and thereafter subjecting the treated polyester sheet material to the action of an agent selected from the group consisting of moist air and moist air containing ammonia or amine vapors.

References Cited
UNITED STATES PATENTS

| | | | |
|---|---|---|---|
| 2,213,477 | 9/1940 | Steindorff et al. | 260—613 |
| 2,720,468 | 10/1955 | Shacklett | 117—34 |
| 2,989,417 | 6/1961 | Overman | 117—34 |
| 3,057,753 | 10/1962 | Blatz | 117—138.8 |
| 3,082,117 | 3/1963 | Schilly | 117—138.8 X |
| 3,119,710 | 1/1964 | Peters | 117—62.1 |
| 3,136,655 | 6/1964 | Wolinski | 117—138.8 X |
| 3,251,913 | 5/1966 | Richards et al. | 264—78 |
| 3,284,232 | 11/1966 | Caldwell | 117—138.8 |
| 3,309,222 | 3/1967 | Caldwell | 117—138.8 |

WILLIAM D. MARTIN, *Primary Examiner.*

R. HUSACK, *Assistant Examiner.*

UNITED STATES PATENT OFFICE
CERTIFICATE OF CORRECTION

Patent No. 3,399,073

August 27, 1968

John R. Caldwell et al.

It is certified that error appears in the above identified patent and that said Letters Patent are hereby corrected as shown below:

Column 9, lines 46 to 50, the formula should appear as shown below:

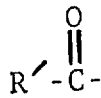

Signed and sealed this 10th day of March 1970.

(SEAL)

Attest:

Edward M. Fletcher, Jr.

Attesting Officer

WILLIAM E. SCHUYLER, JR.

Commissioner of Patents